United States Patent [19]

Abson

[11] 4,244,818

[45] Jan. 13, 1981

[54] METHOD OF REMOVING METALLIC IMPURITIES FROM SEWAGE SLUDGE

[75] Inventor: James W. Abson, Cheadle Hulme, England

[73] Assignee: Simon-Carves Limited, Cheshire, England

[21] Appl. No.: 24,453

[22] Filed: Mar. 27, 1979

[30] Foreign Application Priority Data

Apr. 15, 1978 [GB] United Kingdom ............... 14901/78

[51] Int. Cl.³ ................................................ C02F 1/52
[52] U.S. Cl. .................................... 210/721; 210/724; 210/758
[58] Field of Search .............................. 210/10, 50–53, 210/18, 63 R, 66, 67, 73 S

[56] References Cited

U.S. PATENT DOCUMENTS

| 3,561,598 | 2/1971 | Goldberg | 210/18 |
| 4,038,180 | 7/1977 | Talbert | 210/10 |

FOREIGN PATENT DOCUMENTS

| 2715257 | 6/1978 | Fed. Rep. of Germany | 210/10 |
| 2327965 | 5/1977 | France | 210/10 |
| 49-91076 | 9/1974 | Japan | 210/10 |
| 50-107765 | 8/1975 | Japan | 210/10 |

Primary Examiner—Benoît Castel
Attorney, Agent, or Firm—Norris & Bateman

[57] ABSTRACT

A method of removing metallic impurities from sewage sludge wherein the sludge is first acidified in the presence of an oxidizing agent and held to take metallic impurities into solution. The sludge is then treated with a flocculating agent and thickened by removing liquid prior to dilution with an aqueous liquid free from metallic impurities and wherein the sludge is finally dewatered by a mechanical method.

9 Claims, 1 Drawing Figure

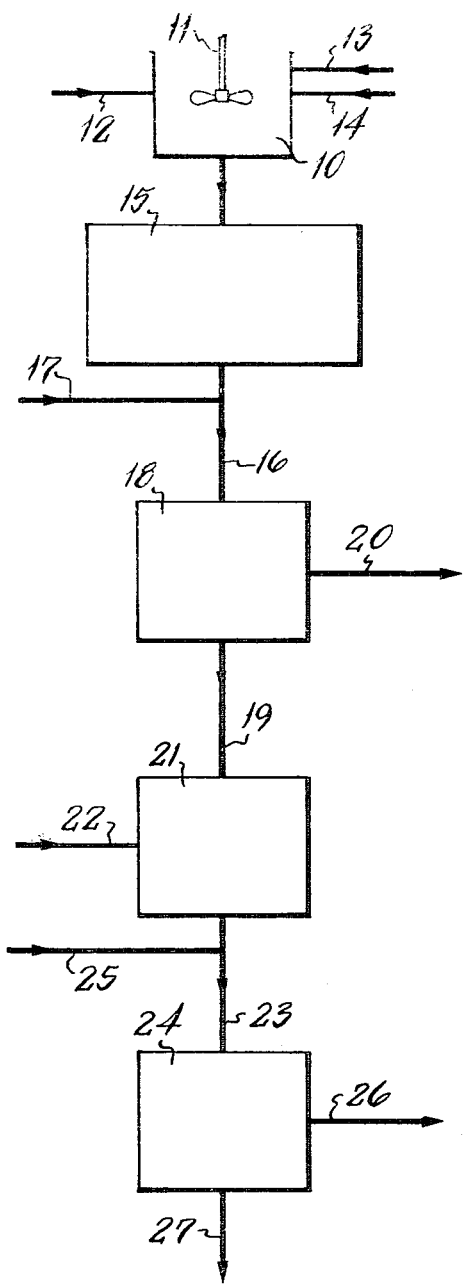

METHOD OF REMOVING METALLIC IMPURITIES FROM SEWAGE SLUDGE

This invention concerns a method of treating sewage sludges.

Conventional treatment methods have the disadvantage of not removing metallic impurities, many of which are highly toxic thus rendering dumping of the sludges environmentally unacceptable. Furthermore there have been a number of proposals to use sewage sludges as animal foodstuff. One problem which has inhibited commercial interest in such proposals is the certainty of removing metallic impurities from the sewage sludges to a sufficient degree to ensure that the resulting foodstuffs are of an acceptably low toxicity.

Various techniques for the removal of metallic impurities by electrolysis, osmosis, ion exchange or solvent extraction, for example, have been investigated and whilst these have been found to be successful to a greater or lesser extent they have relied upon complex and costly equipment.

The present invention is based on the result of research work designed to explore the possibilities of removing metallic impurities from sewage sludges to a very substantial extent by the use of relatively simple and inexpensive equipment.

According to the present invention a method of removing metallic impurities from sewage sludge comprises the steps of taking the metallic impurities into solution by acidifying the sludge in the presence of an oxidising agent, adding a flocculating agent and removing liquid from the sludge to thicken same diluting the thickened sludge with an aqueous liquid which is free or substantially free from metallic impurities and dewatering the sludge by a mechanical method.

The invention will be further apparent from the following description which concerns by way of example only one process for removing metallic impurities from sewage sludges rendering them suitable for use as an animal foodstuff and embodying the method of the invention and with reference to the single FIGURE of the accompanying drawing which shows a flow diagram for the process.

The sewage sludge may be comprised by primary sludge or secondary sludge or a mixture of the two, but in any event will typically have a solids concentration of 2% w/w.

The sludge is fed into a small tank 10 equipped with a mechanical stirrer 11 through a line 12 for treatment with a mineral acid, preferably hydrochloric acid, supplied to the tank 10 through line 13 to give a pH lying approximately within the range of 1 to 1.5, in the presence of an oxidising agent, preferably a solution of hydrogen peroxide, supplied to the tank 10 by line 14. The treated sludge is passed to a holding tank 15 which is so dimensioned as to give a residence time of one to two hours in order to maximise the quantity of metal impurities taken into solution.

This treatment ensures that all of the lead, zinc and cadmium impurities are taken into solution and that more than 50% and 70% of the copper and nickel impurities also go into solution.

The sludge is then passed through line 16 and dosed with a suitable flocculating agent introduced through line 17 prior to removal of free water by a sedimentation or drainage process carried out at a station 18.

A suitable flocculating agent will be one which is effective as a flocculating agent at pH 1 and in oxidising conditions and which does not cause metallic ions in solution to be adsorbed by the solid phase. Polyelectrolyte materials numbered CFR 744 and CFR 767 and manufactured by Allied Colloids Ltd. have been found to be particularly satisfactory.

Sedimentation is preferably effected in a vessel in which the sludge is subjected to a slow stirring action. Drainage is preferably effected by allowing the sludge to stand on a porous belt.

Typically the sludge can be thickened to have a solids concentration of 6% w/w. The thickened sludge is collected for passage through line 19 to the next treatment stage and the removed liquor is rejected through line 20.

The thickened sludge is passed to a tank 21 in which it is diluted with an aqueous liquid supplied by line 22 and which is substantially free from metallic impurities such as a suitable final sewage effluent, for example to give a diluted sludge having typically a solids concentration of 2% w/w.

The diluted sludge is passed through line 23 to a mechanical dewatering machine 24.

If desired the diluted sludge may be further dosed with flocculating agent, of the same or similar kind as that used previously, and introduced through line 25.

Various types of mechanical dewatering machine may be used but the band press disclosed in British Patent Specification No. 1,519,234 has been found to be particularly satisfactory.

The expressed liquor is rejected through line 26 and the sludge cake which will typically have a solids concentration of 30% w/w is collected at 27.

The liquid from lines 20 and 26 can be mixed and treated with lime to precipitate the metallic values as a hydroxide sludge.

The cake can be dumped safely on agricultural land or can be pelletised and subjected to thermal drying to give a final product having a moisture content of 12% or thereabouts which can be mixed with other foodstuffs to form a complete animal feed.

It will be understood that the method described above will be effective in removing approximately 98% of the metallic impurities which are taken into solution at the first stage of the process. In practice and with typical sewage sludges this ensures that the final product will have a toxicity well within accepted safety standards.

It is believed that during any thermal drying step cellulose material contained within the sludge will be hydrolysed by excess acid to form sugars adding to the nutritional value of the feed and at the same time neutralising the material.

It will be appreciated that it is not intended to limit the invention to the above description only, many variations, such as might readily occur to one skilled in the art, being possible without departing from the scope thereof.

Thus, for example, the sludge may be thickened after dilution by sedimentation or drainage prior to the mechanical dewatering step.

Again, for example, the step of treating the sludge with acid in the presence of an oxidising agent may be effected by aerating the sludge vigorously prior to the addition of acid.

I claim:

1. A method of removing metallic impurities from sewage sludge comprising the steps of sufficiently acidifying the sludge to a pH lying approximately within the range 1–1.5 in the presence of an oxidising agent, holding the acidified sludge for a sufficient period of time to maximise the quantity of metallic impurities taken into solution, adding a flocculating agent, thickening said sludge by removing a substantial part of the liquid component containing the now solubilized metallic impurities, replacing the removed liquid with an aqueous liquid which is free or substantially free from metallic impurities and subsequently removing more liquid thus to remove still further residual metallic impurities to render the sludge substantially free of metallic impurities.

2. A method according to claim 1, wherein the acidified sludge is held for one to two hours.

3. A method according to claim 1 wherein liquid is removed from the thickened sludge by a sedimentation process.

4. A method according to claim 1, wherein liquid is removed from the thickened sludge by a drainage process.

5. A method according to claim 1 wherein the sludge containing the replacement liquid is further dosed with additional flocculating agent prior to said subsequent removal of liquid.

6. A method according to claim 1 wherein the sludge is acidified with hydrochloric acid.

7. A method according to claim 1 wherein said oxidising agent is a solution of hydrogen peroxide.

8. A method according to claim 1 inclusive wherein said oxidising agent is comprised by air, the sludge being vigorously aerated prior to the addition of acid.

9. A method according to claim 1 wherein the sludge containing the replacement liquid is thickened by sedimentation or drainage prior to said subsequent removal of liquid.

* * * * *